United States Patent
Nozawa

[19]

[11] Patent Number: 5,153,776
[45] Date of Patent: Oct. 6, 1992

[54] WIDE ANGLE ZOOM LENS SYSTEM

[75] Inventor: Toshihide Nozawa, Tokyo, Japan

[73] Assignee: Olympus Optical Co., Ltd., Tokyo, Japan

[21] Appl. No.: 741,044

[22] Filed: Aug. 6, 1991

[30] Foreign Application Priority Data

Aug. 9, 1990 [JP] Japan ................................. 2-210744

[51] Int. Cl.$^5$ .............................................. G02B 15/00
[52] U.S. Cl. ...................................... 359/676; 359/689
[58] Field of Search ................................ 359/676, 689

[56] References Cited

U.S. PATENT DOCUMENTS

| | | | |
|---|---|---|---|
| 4,934,794 | 6/1990 | Ueda | 359/689 |
| 4,936,661 | 6/1990 | Betensky et al. | 359/692 |
| 4,955,700 | 9/1990 | Yamaguchi | 359/689 |
| 5,042,926 | 8/1991 | Kikuchi | 359/689 |

FOREIGN PATENT DOCUMENTS 64-72114  3/1989  Japan.
2-37317   2/1990  Japan.

Primary Examiner—Janice A. Howell
Assistant Examiner—Kim-Kwok Chu
Attorney, Agent, or Firm—Cushman, Darby & Cushman

[57] ABSTRACT

The present invention provides a zoom lens system designed to be used with cameras which are limitless in terms of their back focal distances, like "lens shutter cameras" and, more particularly, a ternary negative-positive-negative type of wide angle zoom lens system which has an extended zoom range toward the wide angle side so that it can have a field angle of 70° or more at the wide angle end and a zoom ratio of 3 or more, is reduced in the number of lenses involved and the overall length and is made compact. This zoom lens system—which is built up of, in order from the object side, a first lens group of negative refracting power, a second lens group of positive refracting power and a third lens group of negative refracting power.

5 Claims, 6 Drawing Sheets

WIDE ANGLE ZOOM LENS SYSTEM

BACKGROUND OF THE INVENTION (a) Field of the invention

The present invention relates to a wide angle zoom lens system lending itself well fit for use with cameras which are limitless in terms of their back focal distances, like "lens shutter cameras" and, more particularly, to a ternary negative-positive-negative type of wide angle zoom lens system which has an extended zoom range toward the wide angle side so that it can have a field angle of 70° or more at the wide angle end and a zoom ratio of 3 or more.

(b) Description of the Prior Art

So far, many types of zoom lens systems have been known for use with the lens shutter cameras which are limitless in terms of their back focal distances, or other cameras. Of these systems, however, the binary positive-negative type of zoom lens systems are found to have a zoom ratio of at most 2. There are also available ternary zoom lens systems having a zoom ratio of about 3, which are represented by such a ternary positive-positive-negative type of zoom lens system as set forth in Japanese Patent Laid-Open Publication No. 63 (1988)-153511, such a ternary negative-positive-negative type of zoom lens system as described in Japanese Patent Laid-Open Publication No. 64(1989)-72114 and such a ternary positive-negative-positive type of zoom lens system as disclosed in Japanese Patent Laid-Open Publication No. 2(1990)-71220. Japanese Patent Laid-Open Publication No. 2(1990)-37317, on the other hand, proposes a zoom lens system which exceeds 3 in terms of zoom ratio and has a zoom ratio extended toward the wide angle side by reducing its focal length on the wide angle side.

A problem with the binary type of zoom lens system, however, is that when it is intended to extend the zoom ratio to about 3, there is an increase in variations of the magnification of the second lens group; much difficulty is encountered in correcting aberrations because of aberrational fluctuations increased by zooming.

With the ternary type of zoom lens systems, it may be possible to extend the zoom ratio to about 3. However, when the first lens group is of positive refracting power, as is the case with the positive-positive-negative or positive-negative-positive system, it is difficult to form a retrofocus design at the wide angle side. When it is intended to extend the zoom ratio toward the wide angle side, therefore, it is impossible to have sufficient back focal distance, thus causing the off-axial bundle of rays to pass through the 3rd lens group at a position far off the optical axis. This results in an increase in the diameter of the 3rd lens group and renders it difficult to correct off-axial aberrations. In addition, because the associated film surface is located too closely to the surface of the last lens, it is likely that dust deposits on the surface of the last lens may be transferred onto the film, or ghost rays may be emitted by the reflection of light off the film and the surface of the last lens.

By contrast, the ternary negative-positive-negative type of zoom lens system can have sufficient back focal distance at the wide angle side, because it is easy to obtain a retrofocus design at the wide angle side. However, a problem with this type is that difficulty is involved in obtaining a telephoto design at the telephoto side, thus giving rise to an increase in the overall length on the telephoto side. The zoom lens system referred to in the above-mentioned Japanese Patent Laid-Open Publication 2-37317—wherein the zoom ratio is extended by reducing the focal length at the wide angle side to 28.8 mm—also presents a problem that it is increased in the number of lenses involved, with the resulting increase in the overall length at the telephoto side.

SUMMARY OF THE INVENTION

In view of the foregoing, an object of this invention is to solve the above-mentioned problems associated with the prior art by the provision of a ternary negative-positive-negative type of wide angle zoom lens system, which has an extended zoom range toward the wide angle side so that it can have a field angle of 70° or more at the wide angle end and a zoom ratio of 3 or more, is more reduced in the number of lenses involved and the overall length and more compact than this class of conventional zoom lens systems, and is much more improved in terms of aberrational performance.

According to this invention, the above-mentioned object is well accomplished by providing a wide angle zoom lens system which is built up of, in order from the object side, a first lens group of negative refracting power, a second lens group of positive refracting power and a third lens group of negative refracting power, as can be best seen from FIGS. 1, 3 and 5, and in which both the air spaces between the 1st and 2nd lens groups and the 2nd and 3rd lens groups are narrowed when the power is varied from the wide angle side to the telephoto side, characterized by satisfying the following conditions:

$$0.1 < f_{12T}/F_T < 0.35 \quad (1)$$

$$1.0 < |\beta_{3W} \cdot f_3/F_W| < 2.0 \quad (2)$$

$$2.2 < \beta_{3T}/\beta_{3W} < 3.5 \quad (3)$$

wherein:

$F_W$ is the focal length of the overall system at the wide angle end, $F_T$ is the focal length of the overall system at the telephoto end, $f_{12T}$ is the combined focal length of the 1st and 2nd lens groups at the telephoto end, $f_3$ is the focal length of the 3rd lens group, $\beta_{3W}$ is the lateral magnification of the 3rd lens group at the wide angle end, and $\beta_{3T}$ is the lateral magnification of the 3rd lens group at the telephoto end.

Preferably, an aperture stop is located before or after the 2nd lens groups such that it moves together with the 2nd lens group during zooming.

In the description that follows, the action of this invention will be explained specifically with reference to the above-defined conditions, etc.

Condition (1) concerns the overall length of the lens system at the telephoto end. Now considering a telephoto type of lens system built up of a front positive lens group defined by the 1st and 2nd lens groups and a rear negative lens group defined by the 3rd lens group, it is then noted that the shorter the combined focal length $f_{12T}$ of the 1st and 2nd lens groups with respect to the focal length $F_T$ of the overall system, the more enhanced the telephoto effect or, in other words, the more advantageously is the reduction in the overall length achieved. Too enhanced a telephoto effect, however, causes that the focal length $f_3$ of the 3rd lens group is so shortened that difficulty will be involved in correcting aberrations, esp., correcting off-axial aberrations at the wide angle side. This is the reason that Condition (1) is provided as one requirement of this invention. At higher than the upper limit of 0.35 the overall length on the telephoto side will be too long to make the system compact, whereas at less than the lower limit of 0.1 difficulty will be encountered in correcting off-axial aberrations on the wide angle side in particular and in improving aberrational performance.

Condition (2) is directed to the back focal distance of the lens system at the wide angle end. At higher than the upper limit of 2.0, it has a back focal distance that is longer than required and so is unpreferred for use with, e.g. a lens shutter camera; it becomes too long in the overall length at the wide angle end. At less than the lower limit of 1.0, it has a back focal distance so short that, as already mentioned in connection with the problems of the prior art, the 3rd lens group is increased in diameter and difficulty will be experienced in correcting off-axial aberrations. In addition, as the associated film surface is located too closely to the surface of the last lens, it is likely that dust deposits on the surface of the last lens may be transferred onto the film, or ghost rays may be emitted by the reflection of light off the film and the surface of the last lens.

Condition (3) is provided for determining the rate of variable power of the 3rd lens group so as to obtain the required zoom ratio. At higher than the upper limit of 3.5, the magnification shared by the 3rd lens group during zooming is so high that the amount of movement of the 3rd lens group by zooming is increased, rendering it difficult to design the associated lens barrel and incurring an increase in aberrational variations by zooming. At below the lower limit of 2.2, on the other hand, it is impossible to obtain the required zoom ratio without increasing the rate of variable power shared by the 2nd lens group. To this end, it is necessary to enlarge the space between the 1st and 2nd lens groups at the wide angle end and increase the amount of movement of the 2nd lens group. However, this renders it difficult to reduce the overall length of the lens system.

In the present zoom lens system, the aperture stop—which is designed to move together with the 2nd lens group during zooming—is located before or after the 2nd lens group. This aperture stop may possibly be located within the 2nd lens group. With such an arrangement, however, it is required to divide the lens barrel into two parts before and after the aperture stop, thus making the 2nd lens group likely to become off-center before and after the aperture stop. In addition, this increases the number of parts of the lens barrel and so renders it costly.

In order to obtain much more improved lens performance, the lenses of each group should be constructed as follows.

The 1st lens group includes at least one positive lens with the nearest lens to the object side being made up of a negative meniscus lens having its convex surface directed to the object side.

The 2nd lens group includes at least one double-concave negative lens with positive lenses located on the object and image sides, respectively.

The 3rd lens group includes a positive meniscus lens having its convex surface directed to the image plane side as the nearest lens to the object side, and contains at least one negative lens.

More preferably, at least one lens of the 2nd lens group is made up of an aspheric lens with a view to facilitating correction of spherical and coma aberrations.

If some aspheric lens surfaces are used for the 1st and 3rd lens groups, then it is possible to achieve further reductions in the overall length and the number of lenses involved.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1:
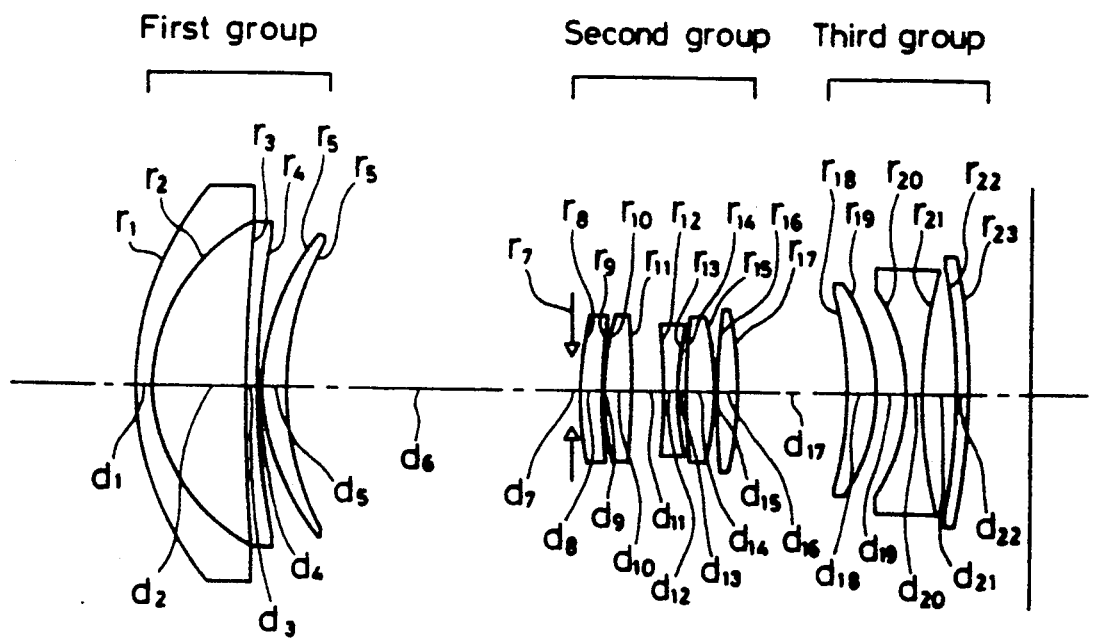
FIGS. 1, 3 and 5 are sectional views of the 1st, 2nd and 3rd embodiments of the zoom lens system according to this invention, respectively.

In what follows, the present invention will be explained more illustratively but not exclusively with reference to the preferred embodiments. Throughout the present disclosure, symbols other than the above-mentioned ones have the following meanings: $F_{NO}$ presents the F number, $\omega$ the half field angle, $r_1$, $r_2$ and so on the radii of curvature of the respective lens surfaces $d_1$, $d_2$ and so on the spaces between the respective lens surfaces $n_{d1}$, $n_{d2}$ and so on the refractive indices at the d lines of the respective lenses and $\nu_{d1}$, $\nu_{d2}$ and so on the Abbe's numbers of the respective lenses. An aspherical geometry with the apex defined as the origin is expressed by the following equation:

$$x = y^2/\{r + (r^2 - y^2)^{1/2}\} + Ey^4 + Fy^6 + Gy^8$$

wherein:

x is the optical axis direction,
y is the direction at right angles with the optical axis,
r is the paraxal radius of curvature, and
E, F and G are the aspherical coefficients.

EXAMPLE 1

$f = 28.85 \sim 54.43 \sim 102.83$
$F_{NO} = 2.88 \sim 4.85 \sim 8.14$
$2\omega = 72.2° \sim 42.2° \sim 23.4°$
$f_B = 6.51 \sim 32.59 \sim 74.07$

| | | | |
|---|---|---|---|
| $r_1 = 33.333$ | $d_1 = 1.80$ | $n_{d1} = 1.77250$ | $\nu_{d1} = 49.66$ |
| $r_2 = 19.124$ | $d_2 = 10.42$ | | |
| $r_3 = 180.540$ | $d_3 = 1.40$ | $n_{d2} = 1.72916$ | $\nu_{d2} = 54.68$ |
| $r_4 = 95.800$ | $d_4 = 0.43$ | | |
| $r_5 = 25.676$ | $d_5 = 2.75$ | $n_{d3} = 1.80518$ | $\nu_{d3} = 25.43$ |
| $r_6 = 33.182$ | $d_6 =$ (Variable) | | |
| $r_7 = \infty$ (Stop) | $d_7 = 0.50$ | | |
| $r_8 = 31.551$ (Aspheric) | $d_8 = 2.82$ | $n_{d4} = 1.56883$ | $\nu_{d4} = 56.34$ |
| $r_9 = 53.639$ | $d_9 = 0.08$ | | |
| $r_{10} = 22.557$ | $d_{10} = 2.93$ | $n_{d5} = 1.51633$ | $\nu_{d5} = 64.15$ |
| $r_{11} = -231.235$ | $d_{11} = 3.87$ | | |
| $r_{12} = -56.714$ | $d_{12} = 1.21$ | $n_{d6} = 1.80518$ | $\nu_{d6} = 25.43$ |
| $r_{13} = 26.984$ | $d_{13} = 1.00$ | | |
| $r_{14} = 104.466$ | $d_{14} = 3.18$ | $n_{d7} = 1.59551$ | $\nu_{d7} = 39.21$ |
| $r_{15} = -27.270$ | $d_{15} = 0.20$ | | |

-continued

| | | | |
|---|---|---|---|
| $r_{16} = 48.981$ | $d_{16} = 2.27$ | $n_{d8} = 1.54739$ | $\nu_{d8} = 53.55$ |
| $r_{17} = -41.957$ | $d_{17} = $ (Variable) | | |
| $r_{18} = -38.056$ | $d_{18} = 3.02$ | $n_{d9} = 1.69895$ | $\nu_{d9} = 30.12$ |
| $r_{19} = -21.111$ | $d_{19} = 3.72$ | | |
| $r_{20} = -18.485$ | $d_{20} = 1.50$ | $n_{d10} = 1.77250$ | $\nu_{d10} = 49.66$ |
| $r_{21} = 56.024$ | $d_{21} = 3.17$ | | |
| $r_{22} = -115.228$ | $d_{22} = 1.70$ | $n_{d11} = 1.69895$ | $\nu_{d11} = 30.12$ |
| $r_{23} = -67.121$ | | | |

Zooming spaces

| | | | |
|---|---|---|---|
| f | 28.85 | 54.43 | 102.83 |
| $d_6$ | 31.27 | 16.02 | 2.00 |
| $d_{17}$ | 12.18 | 4.80 | 1.00 |

Aspherical Coefficients
8th surface $E = -1.0908 \times 10^{-5}$
$F = -2.3676 \times 10^{-8}$
$G = -2.3232 \times 10^{-10}$
$f_{12T}/F_T = 0.28$
$|\beta_{3W} \cdot f_3/F_W| = 1.44$
$\beta_{3T}/\beta_{3W} = 2.63$

EXAMPLE 2

$f = 28.81 \sim 54.39 \sim 102.93$
$F_{NO} = 2.88 \sim 5.08 \sim 8.25$
$2\omega = 76.6° \sim 43.6° \sim 23.6°$
$f_B = 6.50 \sim 32.15 \sim 64.84$

| | | | |
|---|---|---|---|
| $r_1 = 55.502$ | $d_1 = 1.80$ | $n_{d1} = 1.77250$ | $\nu_{d1} = 49.66$ |
| $r_2 = 35.208$ | $d_2 = 12.66$ | | |
| $r_3 = -58.027$ | $d_3 = 1.40$ | $n_{d2} = 1.72916$ | $\nu_{d2} = 54.68$ |
| $r_4 = -1402.140$ | $d_4 = 0.43$ | | |
| $r_5 = 144.150$ | $d_5 = 3.31$ | $n_{d3} = 1.78472$ | $\nu_{d3} = 25.68$ |
| $r_6 = -342.728$ | $d_6 = $ (Variable) | | |
| $r_7 = 32.964$ | $d_7 = 2.23$ | $n_{d4} = 1.49831$ | $\nu_{d4} = 65.03$ |
| $r_8 = 96.707$ | $d_8 = 0.09$ | | |
| $r_9 = 20.343$ | $d_9 = 3.33$ | $n_{d5} = 1.50137$ | $\nu_{d5} = 56.40$ |
| $r_{10} = 130.602$ | $d_{10} = 3.25$ | | |
| $r_{11} = -25.793$ | $d_{11} = 1.20$ | $n_{d6} = 1.80518$ | $\nu_{d6} = 25.43$ |
| $r_{12} = 372.173$ | $d_{12} = 1.00$ | | |
| $r_{13} = 410.989$ | $d_{13} = 4.00$ | $n_{d7} = 1.50137$ | $\nu_{d7} = 56.40$ |
| $r_{14} = -24.801$ | $d_{14} = 0.20$ | | |
| $r_{15} = 78.978$ | $d_{15} = 3.80$ | $n_{d8} = 1.53172$ | $\nu_{d8} = 48.90$ |
| $r_{16} = -36.188$ (Aspheric) | $d_{16} = 0.50$ | | |
| $r_{17} = \infty$ (Stop) | $d_{17} = $ (Variable) | | |
| $r_{18} = -26.112$ | $d_{18} = 3.02$ | $n_{d9} = 1.69895$ | $\nu_{d9} = 30.12$ |
| $r_{19} = -16.544$ | $d_{19} = 2.30$ | | |
| $r_{20} = -18.568$ | $d_{20} = 1.50$ | $n_{d10} = 1.77250$ | $\nu_{d10} = 49.66$ |
| $r_{21} = -32.310$ | $d_{21} = 3.63$ | | |
| $r_{22} = -14.514$ | $d_{22} = 1.70$ | $n_{d11} = 1.77250$ | $\nu_{d11} = 49.66$ |
| $r_{23} = -48.465$ | | | |

Zooming spaces

| | | | |
|---|---|---|---|
| f | 28.81 | 54.39 | 102.93 |
| $d_6$ | 28.50 | 19.45 | 1.50 |
| $d_{17}$ | 12.77 | 4.95 | 2.70 |

Aspherical Coefficients
8th surface $E = -1.9720 \times 10^{-5}$
$F = -1.2270 \times 10^{-8}$
$G = -1.3245 \times 10^{-9}$
$f_{12T}/F_T = 0.29$
$|\beta_{3W} \cdot f_3/F_W| = 1.23$
$\beta_{3T}/\beta_{3W} = 2.65$

EXAMPLE 3

$f = 28.8 \sim 54.4 \sim 102.87$
$F_{NO} = 2.88 \sim 5.04 \sim 8.17$
$2\omega = 74.8° \sim 42.6° \sim 23.4°$
$f_B = 6.74 \sim 35.37 \sim 72.79$

| | | | |
|---|---|---|---|
| $r_1 = 27.900$ | $d_1 = 1.80$ | $n_{d1} = 1.77250$ | $\nu_{d1} = 49.66$ |
| $r_2 = 19.349$ | $d_2 = 12.16$ | | |
| $r_3 = -848.900$ | $d_3 = 1.40$ | $n_{d2} = 1.72916$ | $\nu_{d2} = 54.68$ |
| $r_4 = 87.206$ | $d_4 = 0.43$ | | |
| $r_5 = 32.332$ | $d_5 = 2.93$ | $n_{d3} = 1.80518$ | $\nu_{d3} = 25.43$ |
| $r_6 = 49.300$ | $d_6 = $ (Variable) | | |
| $r_7 = \infty$ (Stop) | $d_7 = 0.50$ | | |
| $r_8 = 27.313$ (Aspheric) | $d_8 = 3.08$ | $n_{d4} = 1.51633$ | $\nu_{d4} = 64.15$ |
| $r_9 = 72.000$ | $d_9 = 0.08$ | | |
| $r_{10} = 21.007$ | $d_{10} = 3.09$ | $n_{d5} = 1.51633$ | $\nu_{d5} = 64.15$ |
| $r_{11} = -125.314$ | $d_{11} = 3.91$ | | |
| $r_{12} = -57.057$ | $d_{12} = 1.21$ | $n_{d6} = 1.80518$ | $\nu_{d6} = 25.43$ |
| $r_{13} = 22.425$ | $d_{13} = 1.00$ | | |
| $r_{14} = 204.738$ | $d_{14} = 3.26$ | $n_{d7} = 1.58267$ | $\nu_{d7} = 46.33$ |
| $r_{15} = -26.902$ | $d_{15} = 0.20$ | | |
| $r_{16} = 64.053$ | $d_{16} = 2.60$ | $n_{d8} = 1.59551$ | $\nu_{d8} = 39.21$ |
| $r_{17} = -47.918$ | $d_{17} = $ (Variable) | | |
| $r_{18} = -28.996$ | $d_{18} = 3.21$ | $n_{d9} = 1.80518$ | $\nu_{d9} = 25.43$ |
| $r_{19} = -18.484$ | $d_{19} = 3.42$ | | |
| $r_{20} = -16.805$ (Aspheric) | $d_{20} = 1.50$ | $n_{d10} = 1.77250$ | $\nu_{d10} = 49.66$ |
| $r_{21} = 270.807$ | | | |

Zooming spaces

| | | | |
|---|---|---|---|
| f | 28.8 | 54.4 | 102.87 |
| $d_6$ | 28.99 | 19.40 | 2.10 |
| $d_{17}$ | 15.14 | 4.64 | 1.00 |

Figure 2A:
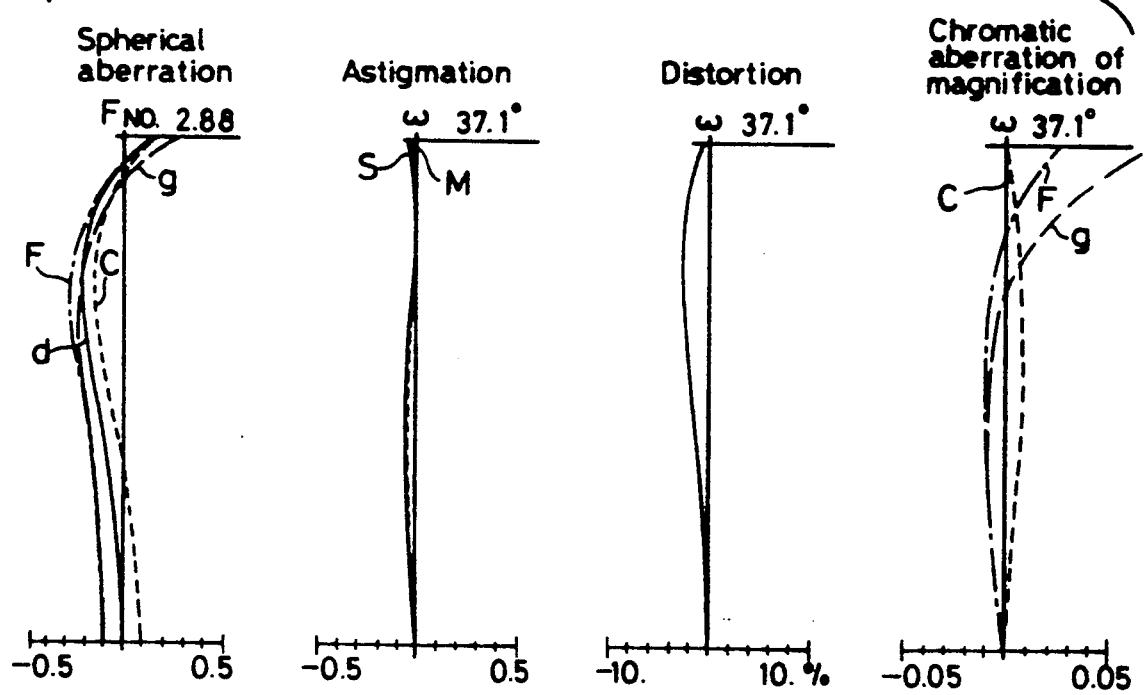
FIGS. 2, 4 and 6 are aberrational diagrams of the 1st–3rd embodiments at the wide angle, standard and telephoto settings (a), (b) and (c), respectively.
Figure 2B:
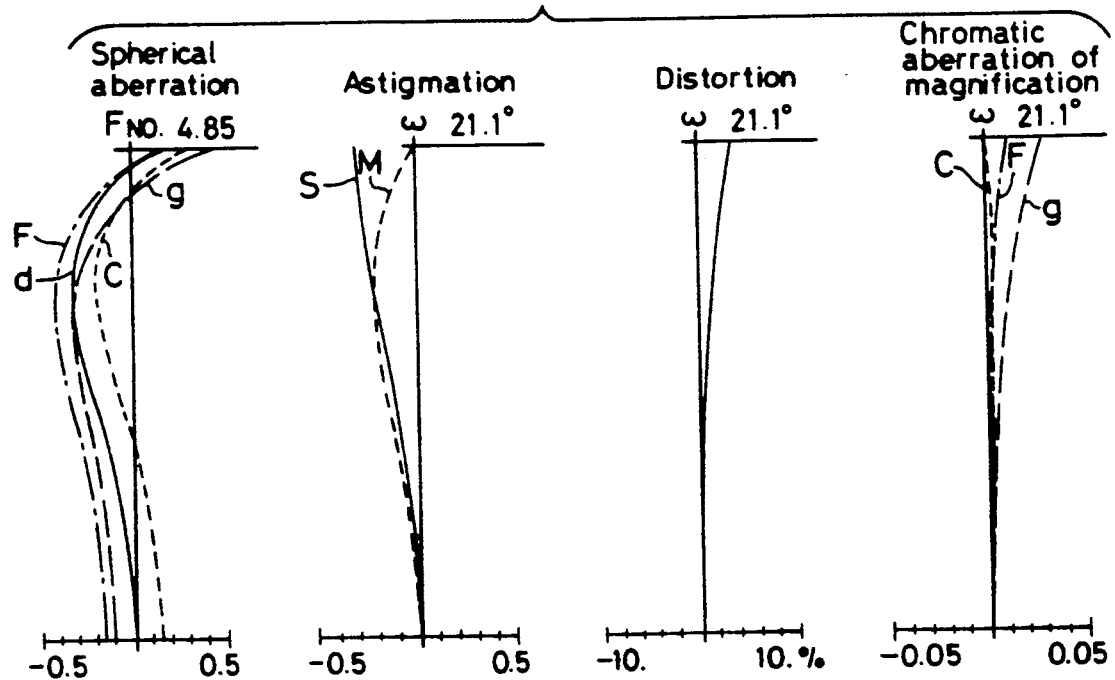
Figure 2C:
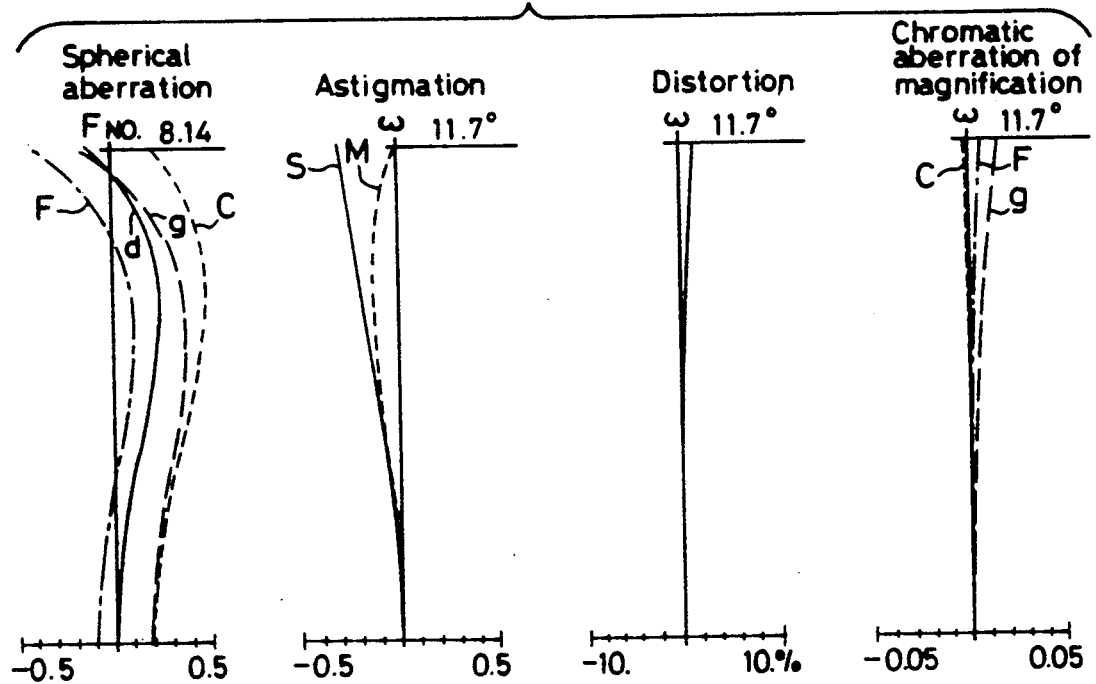

Aspherical Coefficients
8th surface $E = -9.3900 \times 10^{-6}$
$F = -5.3817 \times 10^{-8}$
$G = -1.7664 \times 10^{-11}$ 20th surface $E = -2.0790 \times 10^{-6}$
$F = 3.4889 \times 10^{-8}$
$G = 1.7625 \times 10^{-12}$
$f_{12T}/F_T = 0.31$
$|\beta_{3W} \cdot f_3/F_W| = 1.39$
$\beta_{3T}/\beta_{3W} = 2.65$ As already mentioned, FIG. 1 is a sectional view at the wide angle end of the zoom lens system according to Example 1, which is built up of a first lens group consisting of two negative meniscus lenses, each having its convex surface directed to the object side and one positive meniscus lens having its convex surface directed to the object side; a second lens group consisting of an aperture stop integrally provided in the front thereof, a positive meniscus lens having its convex surface directed to the object side, a double-convex positive lens, a double-concave negative lens and two double-convex positive lenses; and a third lens group consisting of a positive meniscus lens having its convex surface directed to the image plane side, a double-concave negative lens and a positive meniscus lens having its convex surface directed to the image plane side. The aberrational diagrams of this lens system at the wide angle, standard and telephoto settings are shown in FIGS. 2a, 2b and 2c.

Figure 3:
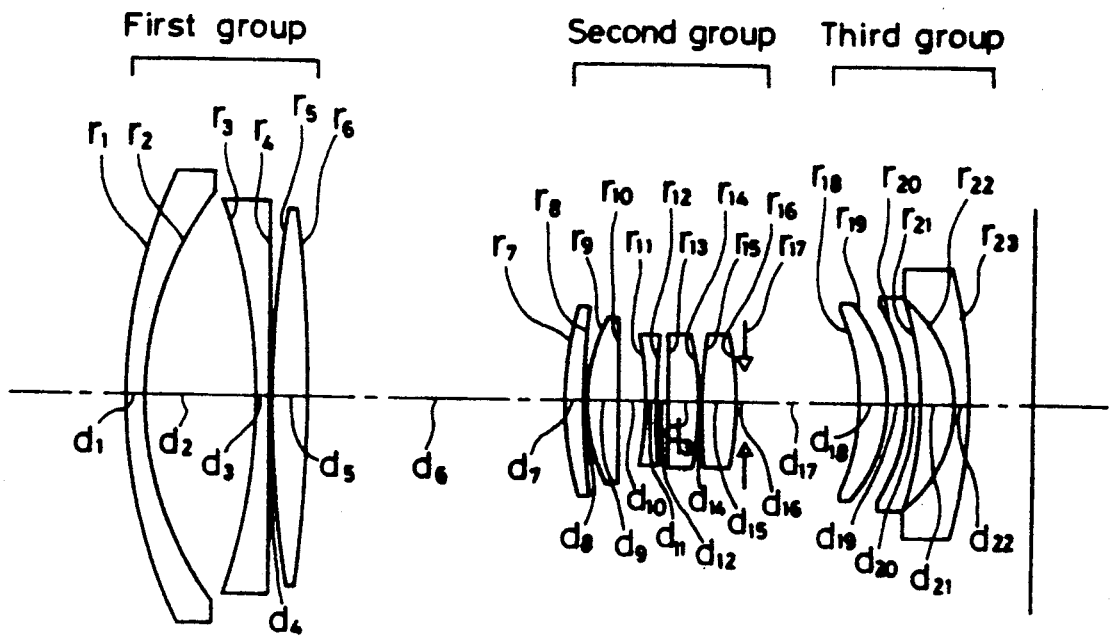
Figure 4A:
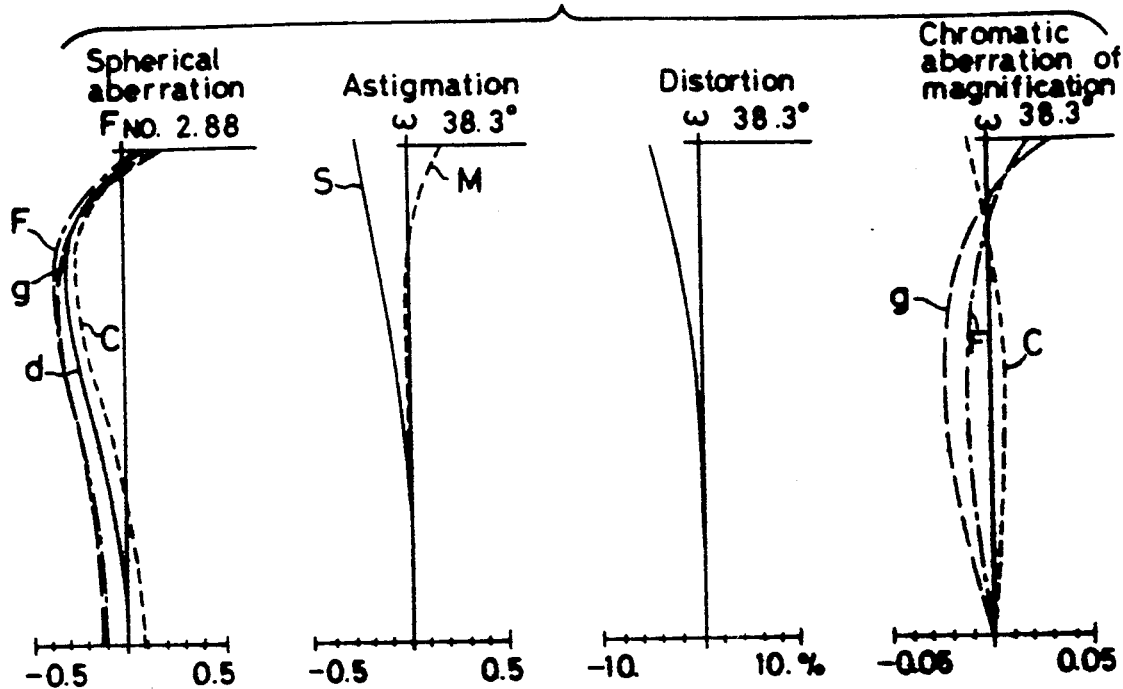
Figure 4B:
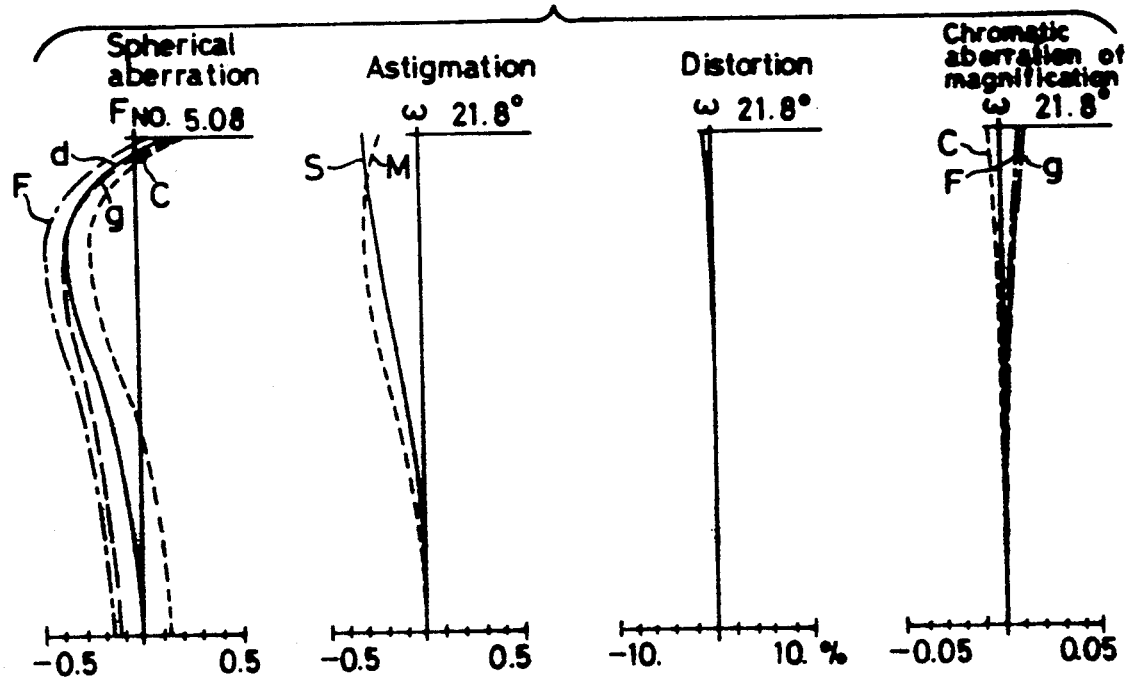
Figure 4C:
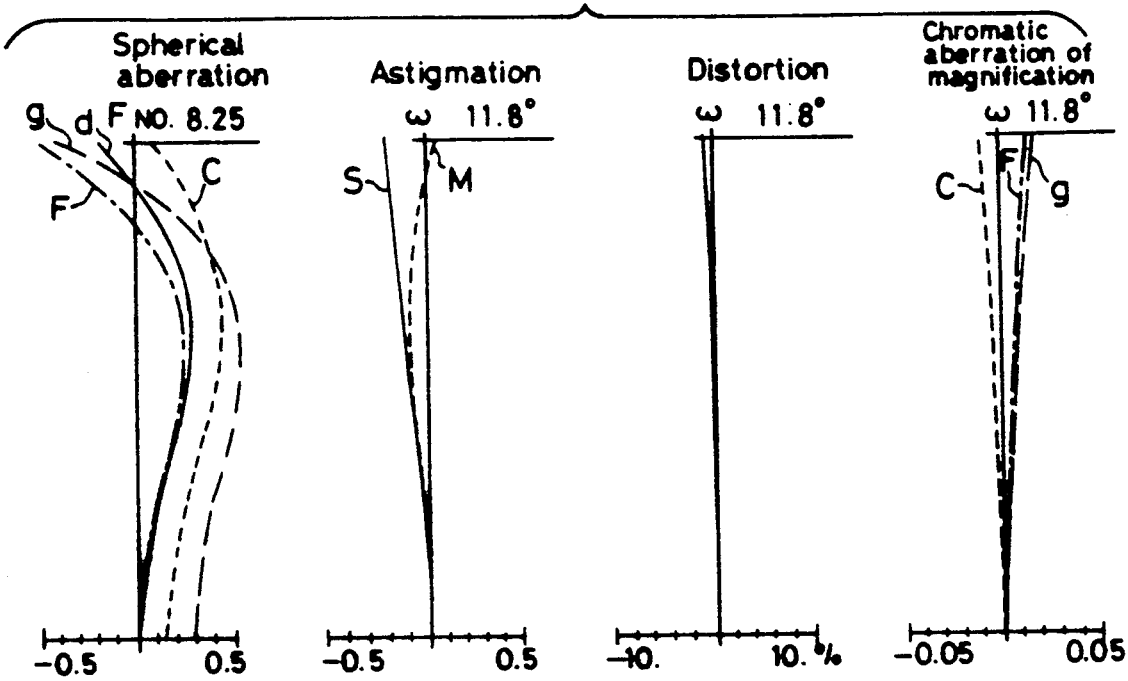

FIG. 3 is a sectional view at the wide angle end of the zoom lens system according to Example 2, which is built up of a first lens group consisting of a negative meniscus lens having its convex surface directed to the object side, a negative meniscus lens having its concave surface directed to the object side and a double-convex positive lens; a second lens group consisting of two positive meniscus lenses, each having its convex surface directed to the object side, a double-concave negative lens, two double-convex lenses and an aperture spot integrally provided in the rear thereof; and a third lens group consisting of a positive meniscus lens having its convex surface directed to the image plane side and two positive meniscus lenses, each having its convex surface directed to the image plane side. The aberrational diagrams of this lens system at the wide angle, standard and telephoto settings are shown in FIGS. 4a, 4b and 4c.

Figure 5:
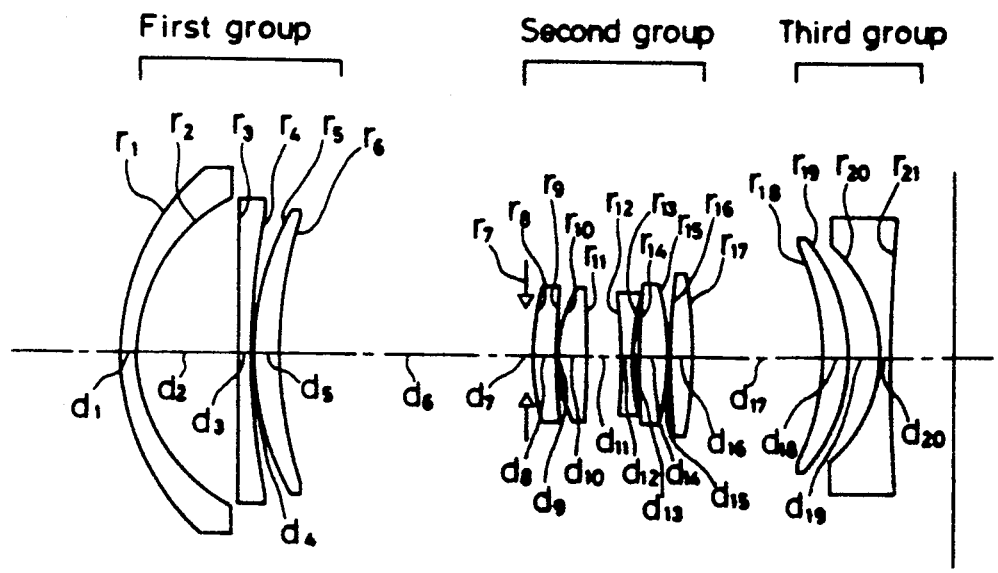
Figure 6A:
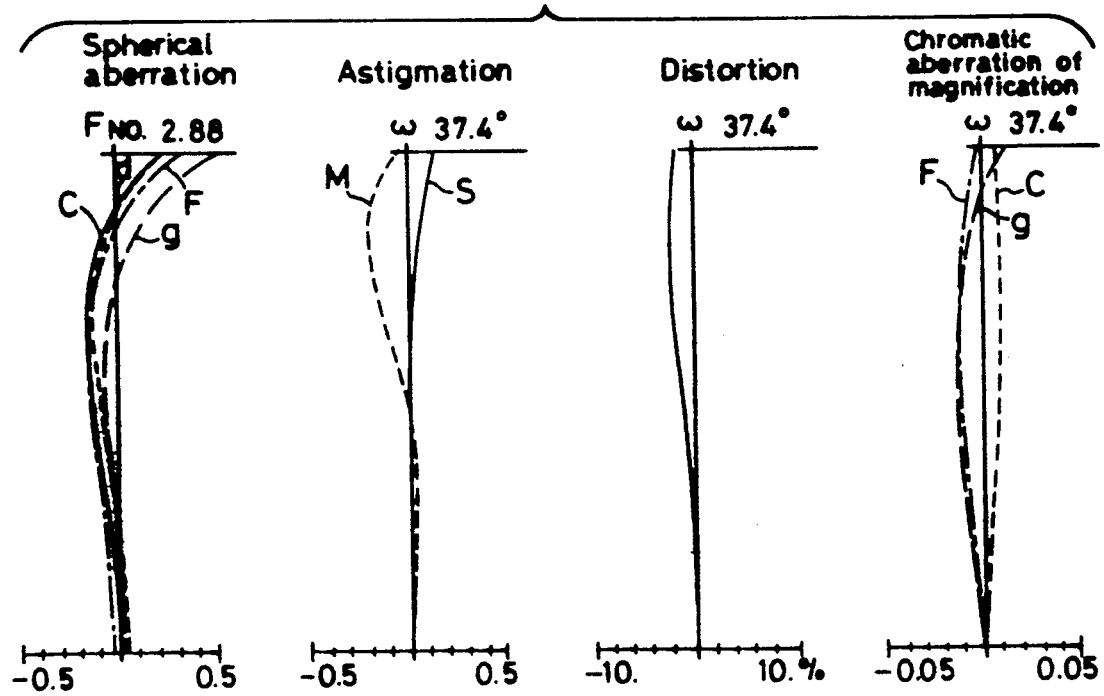
Figure 6B:
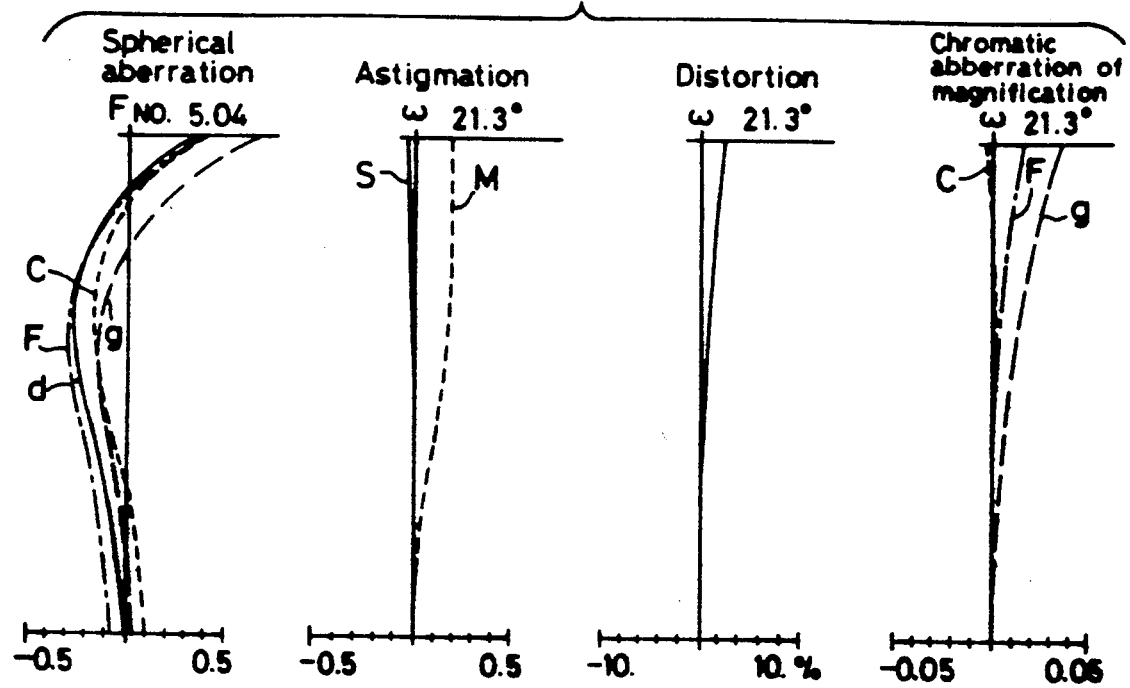
Figure 6C:
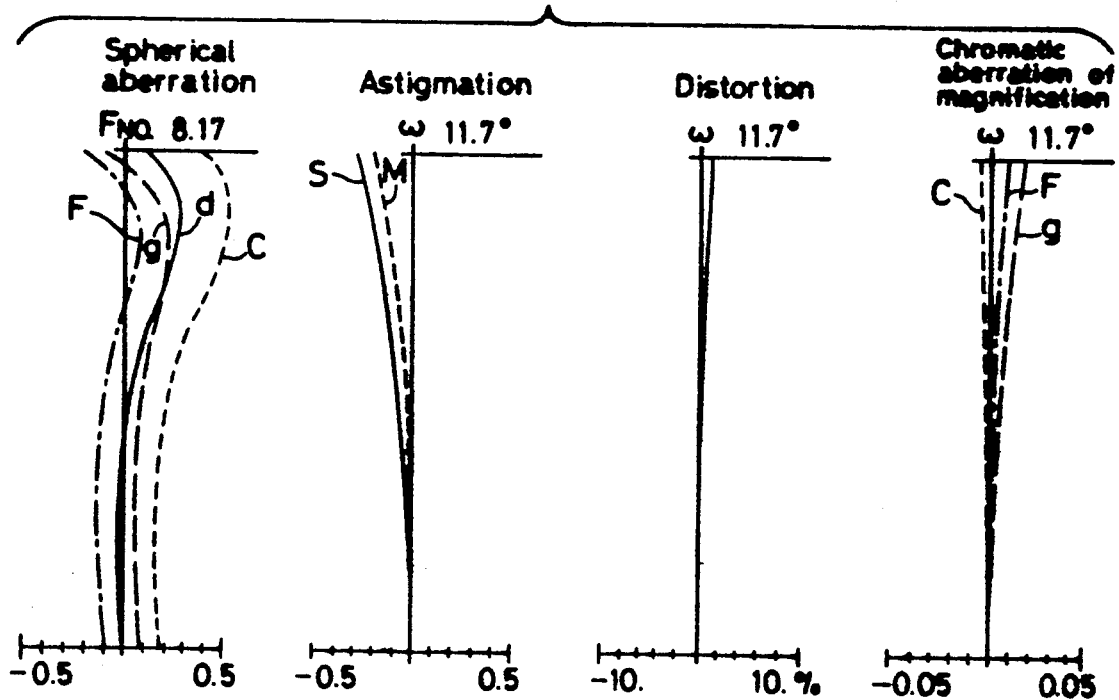

FIG. 5 is a sectional view at the wide angle end of the zoom lens system according to Example 3, which is built up of a first lens group consisting of a negative meniscus lens having its convex surface directed to the object side, a double-concave negative lens and a positive meniscus lens having its convex surface directed to the object side; a second lens group consisting of an aperture stop integrally provided in the front thereof, a positive meniscus lens having its convex surface directed to the object side, a double-convex positive lens, a double-concave negative lens and two double-convex positive lenses; and a third lens group consisting of a positive meniscus lens having its convex surface directed to the image plane side and a double-concave negative lens. The aberrational diagrams of this lens system at the wide angle, standard and telephoto settings are shown in FIGS. 6a, 6b and 6c.

As explained with reference to the above-mentioned examples, the wide angle zoom lens systems according to this invention have a field angle of 70° or more at the wide angle end and a zoom ratio of 3 or more, are more reduced in the number of lenses involved and the overall length than this class of zoom lens system and have a back focal distance enough to reduce the diameter of the third lens groups; they are compact and have improved aberrational performance. The zoom lens systems according to this invention are best-suited for use with the lens shutter cameras in particular.

What is claimed is:

1. A wide angle zoom lens system which is built up of, in order from the object side, a first lens group of negative refracting power, a second lens group of positive refracting power and a third lens group of negative refracting power and in which both the air spaces between the 1st and 2nd lens groups and the 2nd and 3rd lens groups are narrowed when the power is varied from the wide angle side to the telephoto side, characterized by satisfying the following conditions:

$$0.1 < f_{12T}/F_T < 0.35 \quad (1)$$

$$1.0 < |\beta_{3W} \cdot f_3/F_W| < 2.0 \quad (2)$$

$$2.2 < \beta_{3T}/\beta_{3W} < 3.5 \quad (3)$$

wherein:
  $F_W$ is the focal length of the overall system at the wide angle end,
  $F_T$ is the focal length of the overall system at the telephoto end,
  $f_{12T}$ is the combined focal length of the 1st and 2nd lens groups at the telephoto end,
  $f_3$ is the focal length of the 3rd lens group,
  $\beta_{3W}$ is the lateral magnification of the 3rd lens group at the wide angle end, and
  $\beta_{3T}$ is the lateral magnification of the 3rd lens group at the telephoto end.

2. A wide angle zoom lens system as claimed in claim 1, characterized in that an aperture stop is located before or after said second lens group such that it moves together with said second lens group during zooming.

3. A wide angle zoom lens system as claimed in claim 1 or 2, characterized in that said 1st lens group includes at least one positive lens with the nearest lens to the object side made up of a negative meniscus lens having its convex surface directed to the object side, said 2nd lens group includes at least one double-concave negative lens with positive lenses located on the object and image plane sides, respectively, and said 3rd lens group includes a positive meniscus lens having its convex surface directed to the image plane side as the nearest lens to the object side and contains at least one negative lens.

4. A wide angle zoom lens system as claimed in any one of claims 1-2, characterized in that at least one lens of said 2nd lens group is made up of an aspherical lens.

5. A wide angle zoom lens system as claimed in claim 4, characterized in that at least one lens surface of said 1st or 3rd lens group is made up of an aspherical lens.

* * * * *